(12) United States Patent
Liu et al.

(10) Patent No.: US 12,346,995 B2
(45) Date of Patent: Jul. 1, 2025

(54) MACHINE LEARNING DIFFUSION MODEL WITH IMAGE ENCODER TRAINED FOR SYNTHETIC IMAGE GENERATION

(71) Applicant: Lemon Inc., Grand Cayman (KY)

(72) Inventors: Bingchen Liu, Los Angeles, CA (US); Qing Yan, Los Angeles, CA (US); Yizhe Zhu, Los Angeles, CA (US); Xiao Yang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 186 days.

(21) Appl. No.: 18/172,192

(22) Filed: Feb. 21, 2023

(65) Prior Publication Data

US 2024/0282016 A1 Aug. 22, 2024

(51) Int. Cl.
| | |
|---|---|
| G06T 11/00 | (2006.01) |
| G06F 3/14 | (2006.01) |
| G06Q 50/00 | (2024.01) |
| G06T 3/60 | (2024.01) |
| G06V 10/70 | (2022.01) |
| G06V 40/16 | (2022.01) |

(52) U.S. Cl.
CPC ............ G06T 11/00 (2013.01); G06F 3/14 (2013.01); G06Q 50/01 (2013.01); G06T 3/60 (2013.01); G06V 10/70 (2022.01); G06V 40/161 (2022.01); G06V 40/171 (2022.01)

(58) Field of Classification Search
None
See application file for complete search history.

(56) References Cited

U.S. PATENT DOCUMENTS

| | | | | |
|---|---|---|---|---|
| 2016/0307032 | A1* | 10/2016 | Butler | G06V 40/107 |
| 2020/0151561 | A1* | 5/2020 | Kaneko | G06N 3/08 |
| 2021/0065448 | A1* | 3/2021 | Goodrich | G06F 1/1626 |
| 2021/0390789 | A1* | 12/2021 | Liu | G06V 40/161 |
| 2022/0207355 | A1* | 6/2022 | Demyanov | G06N 3/047 |
| 2022/0253993 | A1* | 8/2022 | Nakagawa | H04N 23/634 |
| 2022/0318369 | A1* | 10/2022 | Chae | G06V 10/751 |
| 2023/0134597 | A1* | 5/2023 | Na | G06F 3/0443 345/173 |
| 2024/0104180 | A1* | 3/2024 | S | G06F 21/32 |
| 2024/0135610 | A1* | 4/2024 | Kolkin | G06T 11/60 |
| 2024/0161462 | A1* | 5/2024 | Gandelsman | G06T 5/60 |
| 2024/0428902 | A1* | 12/2024 | Murakami | G06Q 10/0639 |

* cited by examiner

*Primary Examiner* — Andrew G Yang
(74) *Attorney, Agent, or Firm* — Alleman Hall & Tuttle LLP

(57) ABSTRACT

The present disclosure provides systems and methods for generating a synthesized image of a user with a trained machine learning diffusion model. In one example, a computing system includes one or more processors configured to execute instructions stored in memory to execute a trained machine learning diffusion model including an image encoder, a text encoder, and a diffusion model. The image encoder is configured to receive an image of a user and generate a set of embeddings that semantically describe visual features of the user based at least on the image of the user. The text encoder is configured to receive the set of embeddings and generate an input feature vector based at least on the set of embeddings. The diffusion model is configured to receive the input feature vector and generate a synthesized image of the user based at least on the input feature vector.

17 Claims, 11 Drawing Sheets

MACHINE LEARNING DIFFUSION MODEL WITH IMAGE ENCODER TRAINED FOR SYNTHETIC IMAGE GENERATION

BACKGROUND

Machine learning generative models can be implemented in a variety of applications such as image-to-text generation, style transfer, image-to-image translation, and text-to-three-dimensional (3D) object generation. Recent studies on text-to-image generation have shown that large generative models, after being pre-trained on large datasets, are able to generate photorealistic contents that are highly matched with given text prompts. One subclass of these generative models includes diffusion models that are capable of achieving more diversified generated content.

SUMMARY

The present disclosure provides systems and methods for generating a synthesized image of a user with a trained machine learning diffusion model. In one example, a computing system includes one or more processors configured to execute instructions stored in memory to execute a trained machine learning diffusion model including an image encoder, a text encoder, and a diffusion model. The image encoder is configured to receive an image of a user and generate a set of embeddings that semantically describe visual features of the user based at least on the image of the user. The text encoder is configured to receive the set of embeddings and generate an input feature vector based at least on the set of embeddings. The diffusion model is configured to receive the input feature vector and generate a synthesized image of the user based at least on the input feature vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
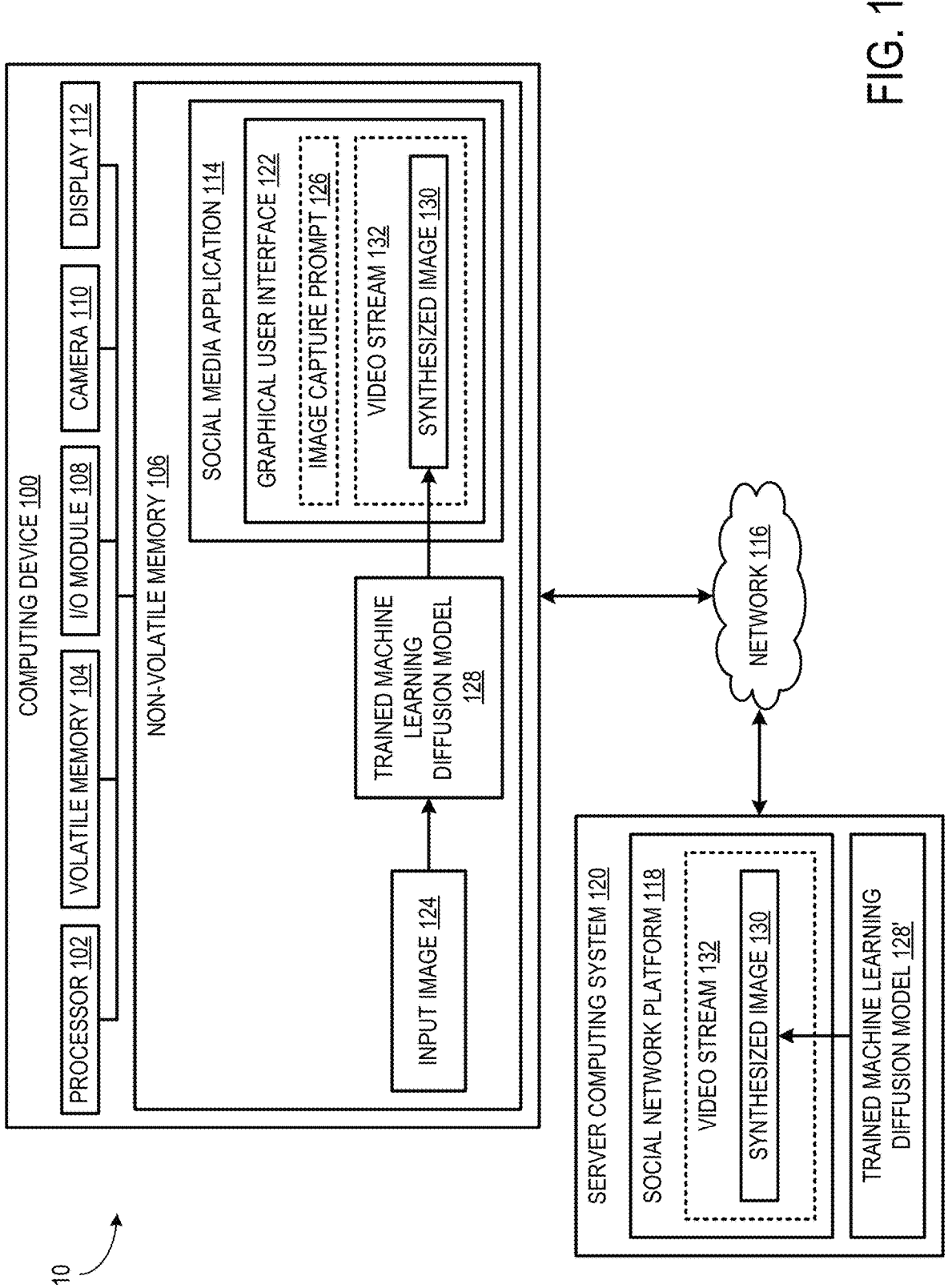
FIG. 1 schematically shows a computing system including a computing device executing a social media application and a server computing system implementing a social network platform, either or both of which can be configured to execute a trained machine learning diffusion model to generate a synthesized image of a user, according to one example of the present disclosure.

One type of conventional generative diffusion model is pre-trained on a large amount of image and corresponding text data to generate image content based on text inputs. For this conventional diffusion model to generate synthesized photorealistic images of a particular user, it needs to be fine-tuned with multiple (10 or more) training images of the user. Once this conventional diffusion model is fine tuned for a particular user, it can generate various synthesized images of a synthetic person who has similar visual features as the user. The synthesized images can have different artistic styles, and the people depicted in the synthesized images can have different clothes and body gestures depending on, for example, scene words and style words that are appended with the user identifier as input to control the conventional diffusion model. However, the process of fine-tuning this conventional diffusion model has several drawbacks.

One drawback is that ten or more training images of a user are required to fine-tune the conventional diffusion model. Gathering these images is a significant burden for a user. Moreover, these training images require specific visual characteristics in order for the conventional diffusion model to be fine-tuned to accurately learn visual features of the user. For example, the lighting conditions and facial features of the user are required to be the same or similar in each of the training images for the conventional model to operate properly. If the appearance of the user varies significantly between the images, due, for example, to differences in hairstyle, headwear, eyewear, camera angle, cosmetics, eyelashes, facial expressions, head postures, etc., the resulting differences in appearance of the user can often cause the conventional diffusion model to be unable to accurately learn the visual features of the user during the fine-tuning process. Additionally, the training images must include a variety of backgrounds and photo angles, and the user must wear different clothing in different training images. If the user is wearing the same dress in all of the training images, the same appearance of the user can cause the previous diffusion model to inaccurately learn that the dress is included in the visual features of the user that are to be used in generation of synthetic images of the user.

Another drawback of the conventional diffusion model is that fine-tuning is a time consuming and computer resource intensive process, because the fine-tuning process involves retraining the entire diffusion model. In one example, using state of the art computer processing hardware, fine-tuning the previous diffusion model for a particular user requires approximately 10 minutes on state of the art computer hardware to suitably learn the visual features of the user from multiple training images of the user.

In order to address these and other drawbacks of the conventional diffusion model, the present disclosure provides systems and methods for generating a synthesized image of a user with a trained machine learning diffusion model in a manner that is less computer resource intensive and faster than prior approaches, including the conventional diffusion model. In one example of the present disclosure, a trained machine learning diffusion model comprises an image encoder, a text encoder, and a diffusion model. The image encoder is configured to receive an image of a user and generate a set of embeddings that semantically describe visual features of the user based at least on the image of the user. More particularly, the image encoder is pre-trained to project general image information into a latent space rich in semantic information that is used to control the trained diffusion model. The image encoder is fine-tuned to directly learn the visual features of the user from the single image of the user and project the visual features into the latent space as the set of embeddings. The text encoder is configured to generate an input feature vector based at least on the set of embeddings. The input feature vector represents the set of embeddings in a format that is consumable by the diffusion model. The diffusion model is configured to generate a synthesized image of the user based at least on the input feature vector. The synthesized image of the user includes visual features of the user as defined by the set of embeddings generated by the image encoder.

The trained machine learning diffusion model employs a pre-trained image encoder that is fine-tuned to directly learn visual features of a particular user from a single image of the user. The technical feature of fine-tuning the image encoder in this manner instead of fine-tuning the diffusion model itself provides the technical benefit of reducing an overall time and consumption of computer resources to enable the trained machine learning diffusion model to generate a synthesized image of a user from an input image of the user relative to previous diffusion models. In one example, using state of the art computer hardware, the trained machine learning diffusion model generates a synthesized image of a user based at least on an input image of the user in 2 seconds as opposed to 10 minutes for the previous diffusion model to generate a synthesized image.

Additionally, the image encoder is fine-tuned to extract visual features of a user from a single image of the user, and correspondingly the trained machine learning diffusion model is configured to generate a synthesized image from the single image of the user. This technical feature provides the technical benefit of reducing the amount of training images required to generate the synthesized image of the user relative to prior approaches including the conventional diffusion model discussed above.

FIG. 1 shows a schematic view of an example computing system 10 including a computing device 100 for generation of synthetic images using a trained machine learning diffusion model. The computing device 100 includes a processor 102 (e.g., central processing units, or "CPUs"), volatile memory 104, non-volatile memory 106, an input/output (I/O) module 108, a camera 110, and a display 112. The different components are operatively coupled to one another. The non-volatile memory 106 stores instructions to execute a social media application 114.

The social media application 114 is configured to communicate via a computer network 116 with a social network platform 118 executed on a server computing system 120 of computing system 10. The social media application 114 includes a graphical user interface (GUI) 122 that is displayed via the display 112. The GUI 122 facilitates initialization of the synthesized image generation process, which includes capturing an image 124 of a user (referred to as input image 124 in FIG. 1) via the camera 110 using the social media application 114.

The social media application 114 may capture the image 124 of the user in any suitable manner. In some implementations, the social media application 114 displays an image capture prompt 126 in the GUI 122. The image capture prompt 126 directs the user to position at least some part of the body of the user (e.g., the face) at a designated location in a field of view of the camera 110. The social media application 114 controls the camera 110 to capture the image 124 of the user based at least on detecting that the user is positioned at the designated location in the field of view of the camera 110. In other implementations, the social media application 114 automatically captures the image 124 of the user during normal use of the social media application 114 without expressly displaying a prompt.

A trained machine learning diffusion model 128 is configured to receive the image 124 of the user and generate a synthesized image 130 of the user based at least on the image 124 of the user captured via the camera 110. The synthesized image 130 includes a character having the same or similar visual features as the user (e.g., the same eye shape, eye color, nose shape, mouth shape, cheek bone shape, complexion etc.). Optionally, the synthesized image 130 includes additional stylized visual features. For example, the character may have different clothes, assume different body poses, and/or may be placed in a different scene. Additionally or alternatively, the synthesized image 130 may have one of a variety of different stylized themes/appearances, such as an oil painting, a pencil drawing, a sepia-toned image, etc. Such visual features are applied to the synthesized image 130 based at least on word embeddings in the trained machine learning diffusion model 128. The trained machine learning diffusion model 128 is configured to generate the synthesized image 130 of the user in a timelier manner than previous diffusion models (e.g., 2 seconds as opposed to 10 minutes) as will be discussed in further detail herein.

In some implementations, the trained machine learning diffusion model 128 may be trained to extract visual features of the face of the user captured in the image 124 of the user. In other implementations, the trained machine learning diffusion model 128 may be trained to extract visual features of at least some or all of the body of the user captured in the image 124 of the user.

In some implementations, the trained machine learning diffusion model 128 may be executed locally on the computing device 100. In other implementations, the trained machine learning diffusion model 128' may be executed on a remote computing system, such as the server computing system 120. In one example, the computing device 100 sends the image 124 of the user to the server computing system 120 via the computer network 116. The trained machine learning diffusion model 128' generates the synthesized image 130 and the server computing system 120 sends the synthesized image 130 to the computing device 100 via the computer network 116.

The social media application 114 is configured to display the synthesized image 130 of the user in the GUI 122 for viewing by the user. Additionally, the social media application 114 is configured to publish or share the synthesized image 130 of the user to the social network platform 118 for viewing by other users of the social network platform 118.

In implementations where the synthesized image 130 is generated on the computing device 100, the computing device 100 sends the synthesized image 130 to the server computing system 120 via the computer network 116 to be published or shared on the social network platform 118. In implementations where the synthesized image 130 is generated on the server computing system 120, the server computing system 120 publishes the synthesized image 130 directly to the social network platform 118.

In some implementations, the social media application 114 optionally may be configured to capture a video stream 132 of the user via the camera 110. The video stream 132 includes a sequence of images of the user. The social media application 114 is configured to display the video stream 132 of the user incorporating the synthesized image 130 of the user in the GUI 122. In some examples, the video stream 132 is captured prior to the synthesized image 130 being generated and then the synthesized image 130 is incorporated into the video stream 132. For example, the synthesized image 130 can be incorporated in the background of the video stream 132. In other examples, the video stream 132 is captured subsequent to the synthesized image 130 being generated. For example, the video stream 132 can capture the user reacting to viewing the synthesized image 130. The synthesized image 130 can be incorporated into the video stream 132 in any suitable manner. Further, the social media application 114 optionally can accomplish publishing the synthesized image 130 to the social network platform 118 by publishing the video stream 132 of the user incorporating the synthesized image 130 to the social network platform 118 for viewing by other users of the social network platform 118.

Figure 2:
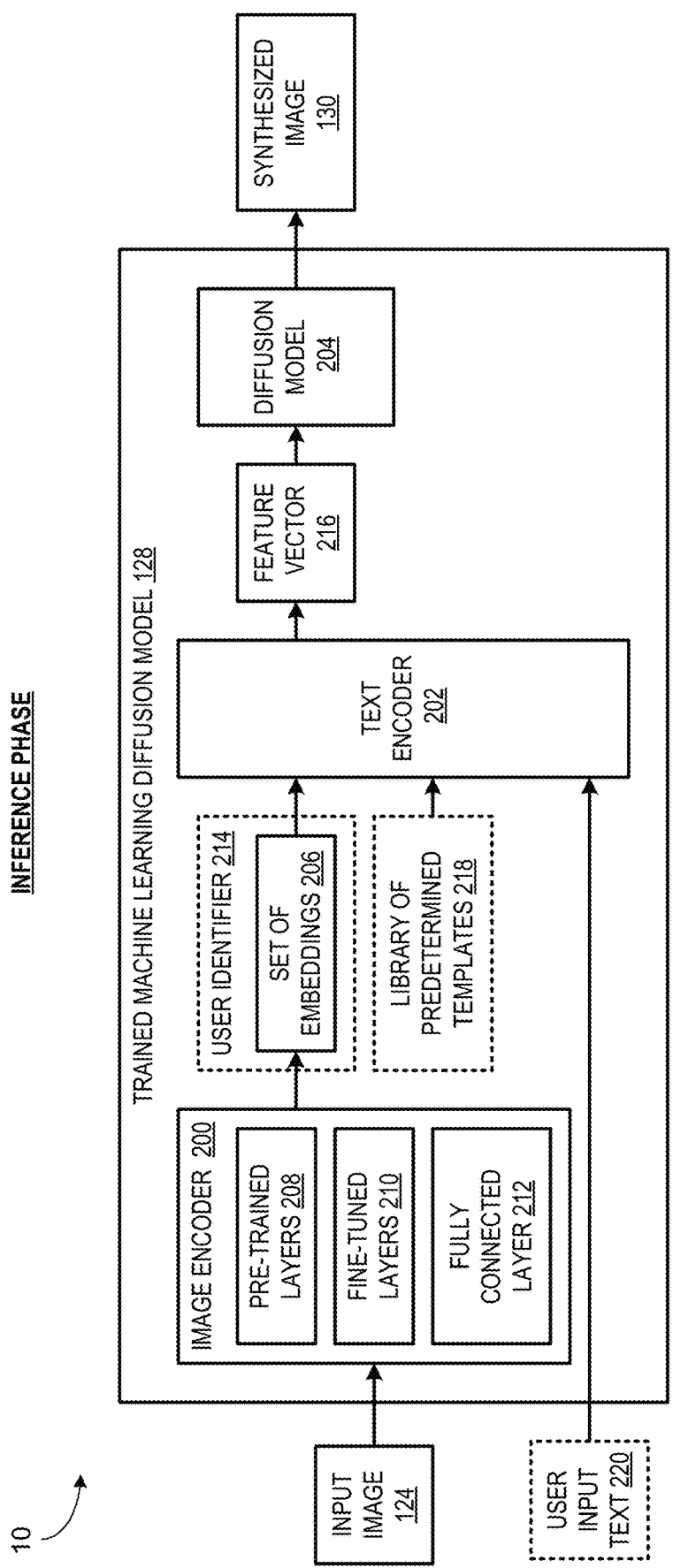
FIG. 2 schematically shows a data flow of an example inference phase of the trained machine learning diffusion model implemented by the computing system of FIG. 1.

FIG. 2 schematically shows a data flow of an example inference phase of the trained machine learning diffusion model 128 (or 128') shown in FIG. 1. The trained machine learning diffusion model 128 includes an image encoder 200, a text encoder 202, and a diffusion model 204.

The image encoder 200 is configured to receive the image 124 of the user and generate a set of embeddings 206 that semantically describes visual features of the user based at least on the image 124 of the user. The set of embeddings is selected from a lexicon of embeddings within a latent space. Embeddings resembling each other are positioned closer to one another in the latent space. The dimensionality of the latent space is selected to be lower than the dimensionality of the pixel space from which the embeddings are drawn, making the construction of the latent space an example of dimensionality reduction, which can also be viewed as a form of data compression that allows for faster processing to generate the synthesized image 130.

In one example, the image encoder 200 includes a vision transformer (ViT). The ViT processes the image 124 of the user by splitting the image 124 into a plurality of smaller two-dimensional image patches. The ViT flattens each image patch into a vector. The ViT generates a sequence of lower-dimensional embedded image patches by mapping the flattened patches to a number of dimensions with a trainable linear projection. The ViT adds positional embeddings to the sequence of lower-dimensional embedded image patches and feeds the sequence as input to a pre-trained transformer encoder to generate the set of embeddings 206 that semantically describe visual features of the user based at least on the image 124 of the user.

The ViT is provided as a non-limiting example. In other implementations, the image encoder may include another type of transformer encoder.

In some implementations, the image encoder 200 includes a plurality of pre-trained layers 208 (e.g. 14 pre-trained layers) that are trained for general object recognition. In one example, the plurality of pre-trained layers are from a pre-trained Contrastive Language-Image Pre-training (CLIP) ViT. In some implementations, the image encoder 200 further includes a plurality of fine-tuned layers 210 (e.g., 8 fine-tuned layers) that are re-trained specifically to extract visual features of the user from the image 124 of the user. In some implementations, the plurality of fine-tuned layers are re-trained to extract visual features of a face of the user. In other implementations, the plurality of fine-tuned layers are re-trained to extract visual features of a body of the user. In some implementations, the image encoder 200 includes a fully connected layer 212 configured to generate the set of embeddings 206 based at least on the visual features of the face of the user extracted by the plurality of fine-tuned layers 210. For example, the fine-tuned layers 210 may extract the visual features of the face of the user as a set of latent-space embeddings, and the fully connected layer 212 may be configured to map the set of latent-space embeddings to a set of word embeddings that is suitable for processing by the text encoder 202. In one particular example, the image encoder 200 is configured to receive a cropped image of the face of the user having a resolution of 336×336 pixels and output a set of word embeddings including 4 word embeddings each having 768 dimensions that are used to describe the facial features of the user.

In some implementations, the set of embeddings 206 generated for the image 124 of the user is associated with a user identifier 214 that acts as a placeholder in a text description that is used by the diffusion model 204 to generate the synthesized image 130. At inference time, the user identifier is implanted in different word embeddings or combined with different sentences by the text encoder 202, and the diffusion model 204 synthesizes a character (i.e., a synthetically generated image of a person) having the visual features of the user in different contexts based at least on the user identifier and the word embeddings and/or sentences. In other words, when the diffusion model 204 encounters the user identifier 214 at inference time, the diffusion model 204 substitutes (i.e., encodes or transforms) the set of embeddings 206 that semantically describe the visual features of the user in place of the user identifier 214.

The text encoder 202 is configured to receive the set of embeddings 206 (and/or the user identifier 214) and generate an input feature vector 216 based at least on the set of embeddings 206. The input feature vector 216 represents the set of embeddings 206 as a list of vectors in a high-dimensional vector space (e.g., 768 dimensions), which is in a format that is suitable for processing by the diffusion model 204.

In some implementations, the text encoder 202 may receive additional input that influences the visual appearance and/or content included in the synthesized image 130. In some implementations, the trained machine learning diffusion model 128 may include a library 218 of predetermined templates. Each template may include a different combination of embeddings corresponding to a different combination of style and/or scene words that are used to generate the synthesized image 130. Non-limiting examples of such descriptive templates include a digital image of a magic witch with mystic lights in the background; a portrait of a warrior with dramatic lighting and a mountain background; an oil painting of a person wearing a hip-hop rap Christmas hat; a half body portrait of a doctor wearing blue scrubs and a white coat; and a sketch portrait of a head of a person. A template may include any suitable description of a scene and/or person. The library 218 may include any suitable number of different templates. In some examples, a different template may be selected (e.g., at random) each time a different synthesized image is generated by the trained machine learning diffusion model 128. The selected template and the set of embeddings 206 may be provided as input to the text encoder 202 and the text encoder 202 may generate the input feature vector 216 based at least on the selected template and the set of embeddings 206.

In some implementations, the trained machine learning diffusion model 128 may be configured to receive user input text 220 (e.g., via I/O module 108 shown in FIG. 1). The user input text 220 may include style and/or scene words that describe visual features that the user desires to have represented in the synthesized image 130. The user input text and the set of embeddings 206 may be provided as input to the text encoder 202 and the text encoder 202 may generate the input feature vector 216 based at least on the user input text 220 and the set of embeddings 206.

The diffusion model 204 is configured to receive the input feature vector 216 and generate the synthesized image 130 of the user based at least on the input feature vector 216. In one example, the diffusion model 204 is a pretrained Stable Diffusion model. The Stable Diffusion model processes the input feature vector 216 in an iterative fashion starting with a random starting image information array—e.g., a latent array. The Stable Diffusion model iteratively denoises random noise from the latent array until a designated number of iterations have been reached. Each iteration operates on an input latent array and produces another latent array that better resembles the visual information encoded in the input feature vector 216 based at least on concepts and image information used to train the Stable Diffusion model along with an attention mechanism.

Note that the Stable Diffusion model is provided as one non-limiting example of a diffusion model. In other examples, the diffusion model may include another type of graph-to-text generative model based at least on Diffusion.

Since the image encoder 200 is fine-tuned to learn the visual features of the user based at least on the input image 124, the diffusion model 204 does not need to be fine-tuned on the input image 124. Instead the diffusion model 204 is pretrained and controlled based at least on the fine-tuned image encoder 200. This technical feature provides the technical benefit of reducing time and consumption of computing resources to generate the synthesized image 130 relative to an approach that lacks a fine-tuned image encoder and instead requires the diffusion model to be fine-tuned on multiple input images of a user to generate a synthesized image of the user.

Figure 3:
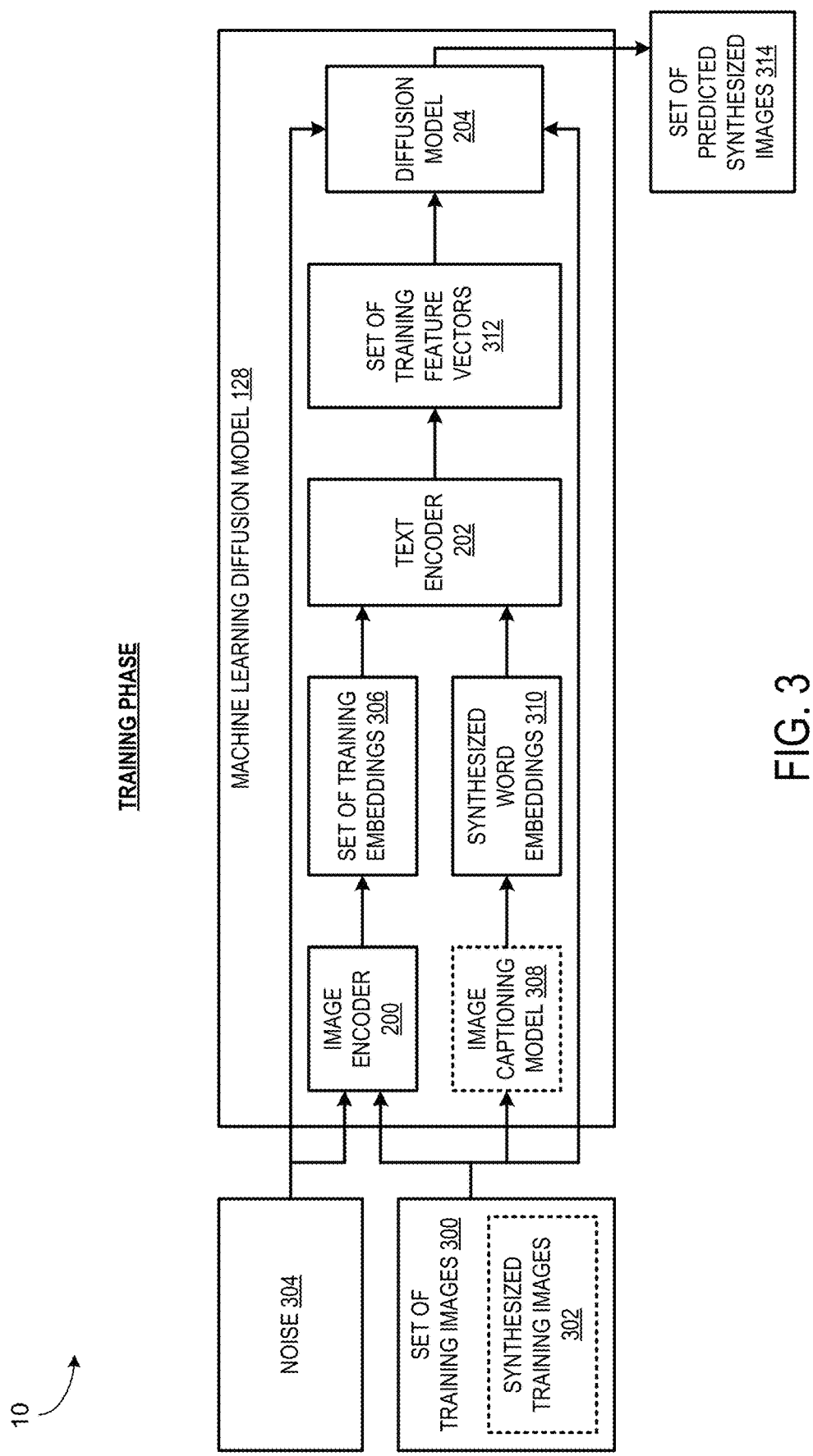
FIG. 3 schematically shows a data flow of an example training phase of the machine learning diffusion model implemented by the computing system of FIG. 1.

FIG. 3 schematically shows a data flow of an example training phase of the machine learning diffusion model 128. A set of training images 300 is generated to train the image encoder 200. In some examples, the set of training images 300 includes images of faces of different people. In some examples, the set of training images 300 includes a set of open-source images.

In some implementations, the set of training images 300 includes a plurality of synthesized training images 302 that are generated based at least on an initial training image of the set of training images 300. Each of the plurality of synthesized training images 302 is modified relative to the initial training image by one or more of rotating, horizontally flipping, and/or cropping the initial training image to generate the synthesized training image. Any suitable number of training images of the set of training images 300 may be modified in this manner or another manner to generate the synthesized training images 302. Doing so increases the number and variety of training images, which improves the generalization ability and robustness of the image encoder 200. For example, the image encoder 200 can learn facial features without being disturbed or confused by different face angles or different face orientations by having such variation provided by the synthesized training images 302.

An amount of noise 304 is added to each of the training images of the set of training images 300. In one example, a time T (e.g., 0 to 1000) is randomly selected to add the corresponding degree of noise to the set of training images 300. The set of training images 300 with the corresponding amount of noise 304 are fed to the image encoder 200 to generate a set of training embeddings 306 based at least on the set of training images 300 and the amount of noise 304. In some examples, values of embedding of the set of training embeddings 306 output by the image encoder 200 are constrained by L1-norm to ensure that the training embeddings remain within the word embedding space this improves the text binding ability of the training output of the image encoder 200.

In some implementations, a trained image captioning model 308 is configured to generate synthesized word embeddings 310 for each image in the set of training images 300. Non-limiting examples of captions generated by the image captioning model 308 include a woman wearing a beautiful dress; a man with a well shaved beard; a ninja in the mountains. The image captioning model 308 may generate any suitable synthesized word embedding that caption the training images based at least on embeddings in the lexicon used for the machine learning diffusion model 128. By using the synthesized word embeddings to train the diffusion model 204, a text binding ability of the output of the image encoder 200 is enhanced which in turn enhances training of the diffusion model 204 to generate synthesized images having visual features that include the synthesized word embeddings.

The set of training embeddings 306 (and the set of synthesized word embeddings 310 when applicable) are fed to the text encoder 202. The text encoder 202 generates a set of training feature vectors based at least on the set of training embeddings 306 (and the set of synthesized word embeddings 310 when applicable). The set of training feature vectors 312 are fed to the diffusion model 204 and the diffusion model 204 generates a set of predicted synthesized images 314 based at least on the set of set of training feature vectors 312. The diffusion model 204 compares the set of predicted synthesized images 314 to the original set of training images 300 and the amount of noise 304. The diffusion model 204 learns the differences between each of the training images 300 and the predicted synthesized images 314 by making iterative adjustments based at least on minimizing a loss function between each training image and each predicted synthesized image to train the diffusion model 204.

In some implementations, different elements of the machine learning diffusion model 128 can be trained together in some phases and separately in other phases. In one example, the text encoder 202 and the diffusion model 204 are trained together for 20,000 iterations. Then, the image encoder 200, the text encoder 202, and the diffusion model 204 are trained together for an additional 50,000 iterations. The different elements of the machine learning diffusion model 128 can be trained together or separately for any suitable number of different iterations. The machine learning diffusion model 128 can be trained in any suitable manner.

Note that the image encoder 200 is pretrained based at least on the set of training images 300 during the training phase. Then, during the inference phase, the image encoder 200 is fine-tuned on the input image 124 of the user. The other elements of the machine learning diffusion model 128 are pretrained during the training phase.

Figure 4A:
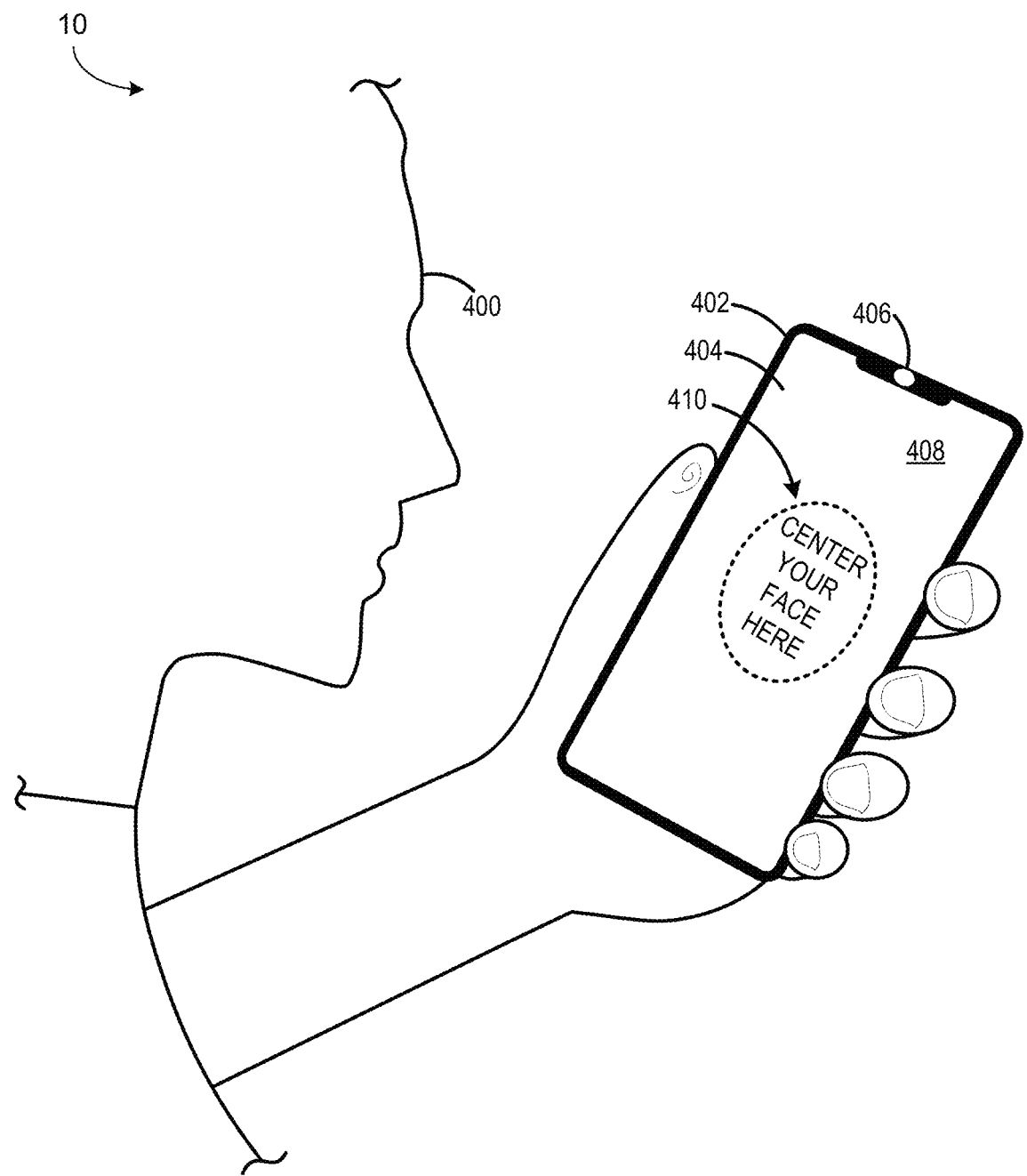
FIGS. 4A-4D show an example use case in which a computing device of the computing system of FIG. 1 generates and displays a synthesized image of a user.

FIGS. 4A-4D show an example use case in which a computing device generates and displays a synthesized image of a user according to the herein described approach. In FIG. 4A, a user 400 holds a computing device in the form of a smartphone 402. The smartphone 402 includes a display 404 and a camera 406 positioned on a same side of the smartphone 402 as the display 404. The smartphone 402 executes a social media application configured to communicate via a computer network with a social network platform executed on a server computing system. The social media application includes a GUI 408 displayed via the display 404. The social media application is configured to display, via the display 404, a prompt 410 in the GUI 408. The prompt 410 directs the user 400 to position the face of the user 400 at a designated location in a field of view of the camera 406. In the illustrated example, the prompt 410 includes an oval that is displayed in the GUI 408 along with a live video stream captured via the camera 406. The user 400 can use the live video stream as visual feedback to adjust the position of the head of the user and/or the smartphone 402 to align with the oval 410.

Figure 4B:
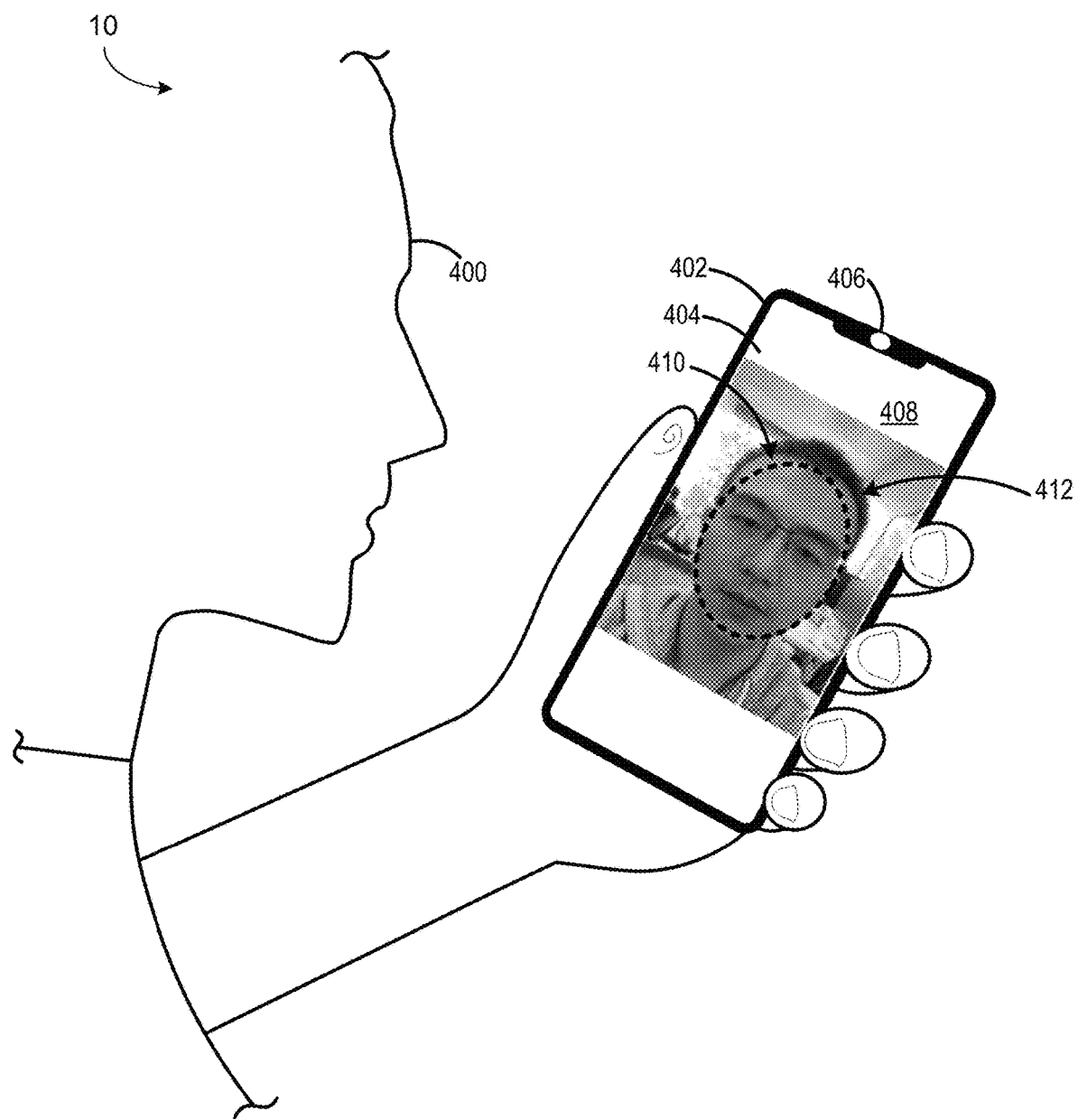

In FIG. 4B, the social media application detects that a face 412 of the user is aligned with the oval 410 and captures an input image of the face of the user via the camera 406. In the illustrated example, the social media application captures the input image of the user in an explicit manner. In other examples, the social media application may be configured to capture an input image of the user via the camera in a more automatic/discrete manner without displaying a prompt.

Figure 4C:
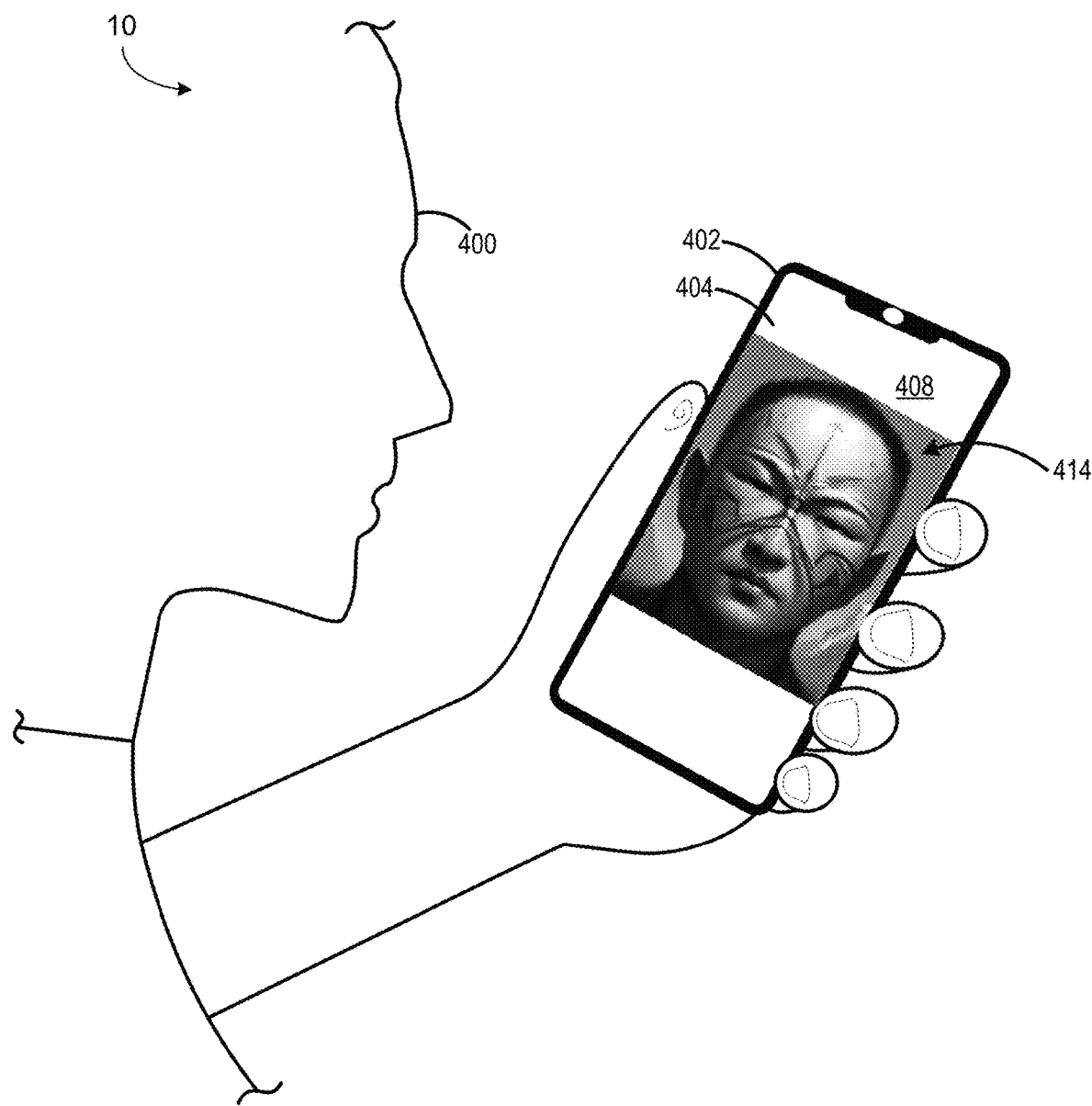

In FIG. 4C, a synthesized image 414 of the user is generated via a trained machine learning diffusion model based at least on the captured image of the face of the user and displayed in the GUI 408. In one example, the trained machine learning diffusion model corresponds to the trained machine learning diffusion model 128 shown in FIGS. 1 and 2. In the illustrated example, the synthesized image 414 depicts a warrior character having similar facial features as the user but with additional face paint and embellished elven ears. Additionally, the background of the synthesized image 414 includes mountains and dramatic lighting. In some examples, the social network application publishes or shares the synthesized image 414 of the user to the social network platform for viewing by other users of the social network platform.

Figure 4D:
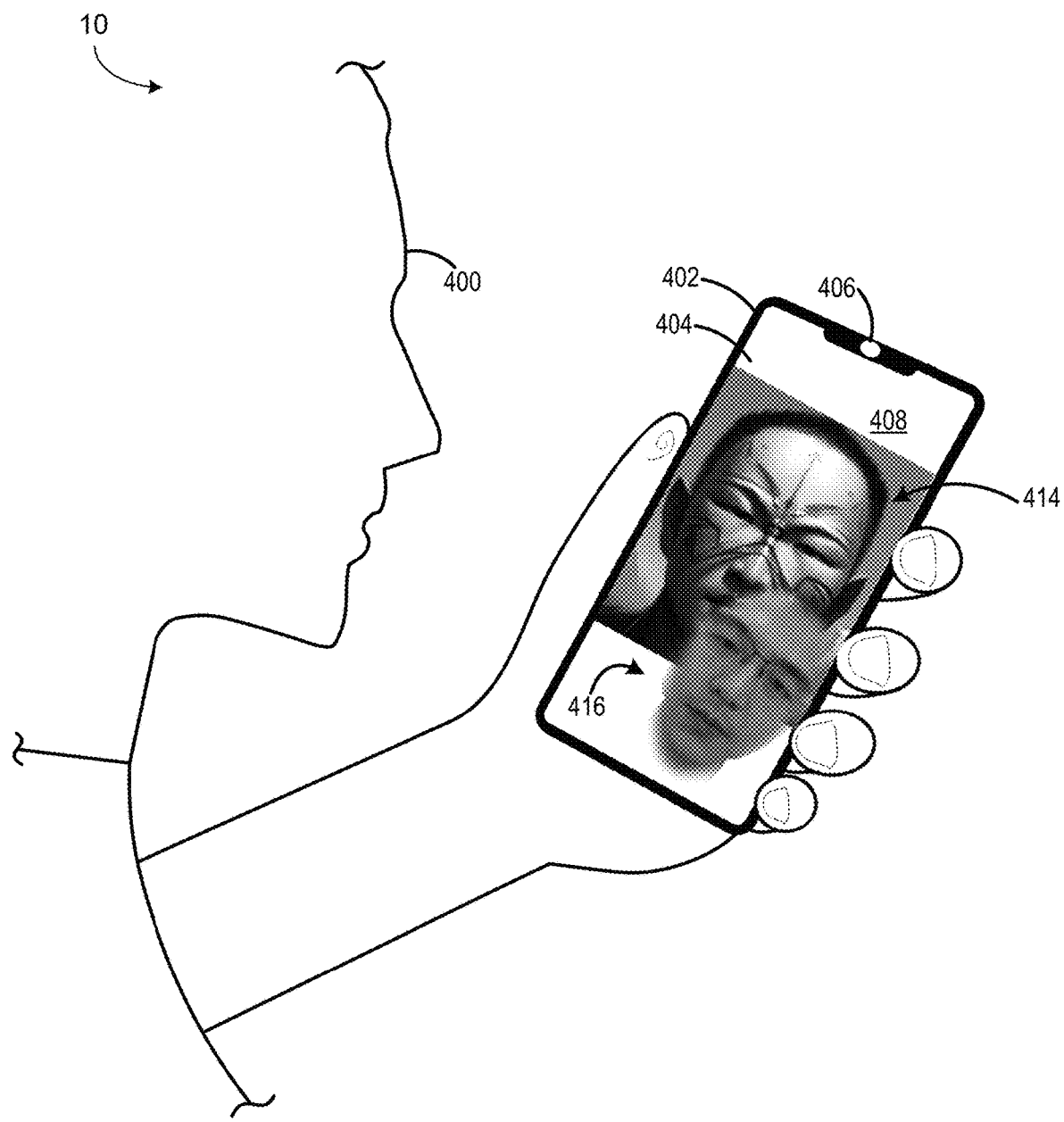

In FIG. 4D, the social media application captures a video stream 416 of the user via the camera 406 and displays the video stream 416 of the user in the GUI 408, via the display 404. The video stream 416 incorporates the synthesized image 414 of the user. For example, the video stream 416 may capture the reaction of the user viewing the synthesized image 414. In the illustrated example, the video stream 416 includes the face of the user cropped or masked and overlaid on the synthesized image 414. The synthesized image 414 can be incorporated into the video stream 416 in any suitable manner. Additionally, the social media application can accomplish publishing the synthesized image to the social media platform by publishing or sharing the video stream of the user incorporating the synthesized image to the social network platform for viewing by other users of the social network platform. In other examples, the social media application displays the synthesized image 414 in the GUI 408 without incorporating the synthesized image 414 in the video stream.

Because the trained machine learning diffusion model includes an image encoder that is pretrained and then fine-tuned on the input image of the particular user, the entire machine learning diffusion model does not have to be overall fine-tuned for a particular user in order to generate a synthesized image of the user. This technical feature enables a synthesized image of a user to be generated much quicker (e.g., approximately 2 seconds or less after the input image is captured) than other diffusion models that require overall fine-tuning over a much longer period of time (e.g. 10 minutes or longer) and based at least on more input images (e.g., 10 input images). This technical feature provides the technical benefits of making the social media application more user friendly and promoting user engagement with the social media application to generate different synthesized images of the user and share the different synthesized images of the user with other users of the social network platform.

Figure 5:
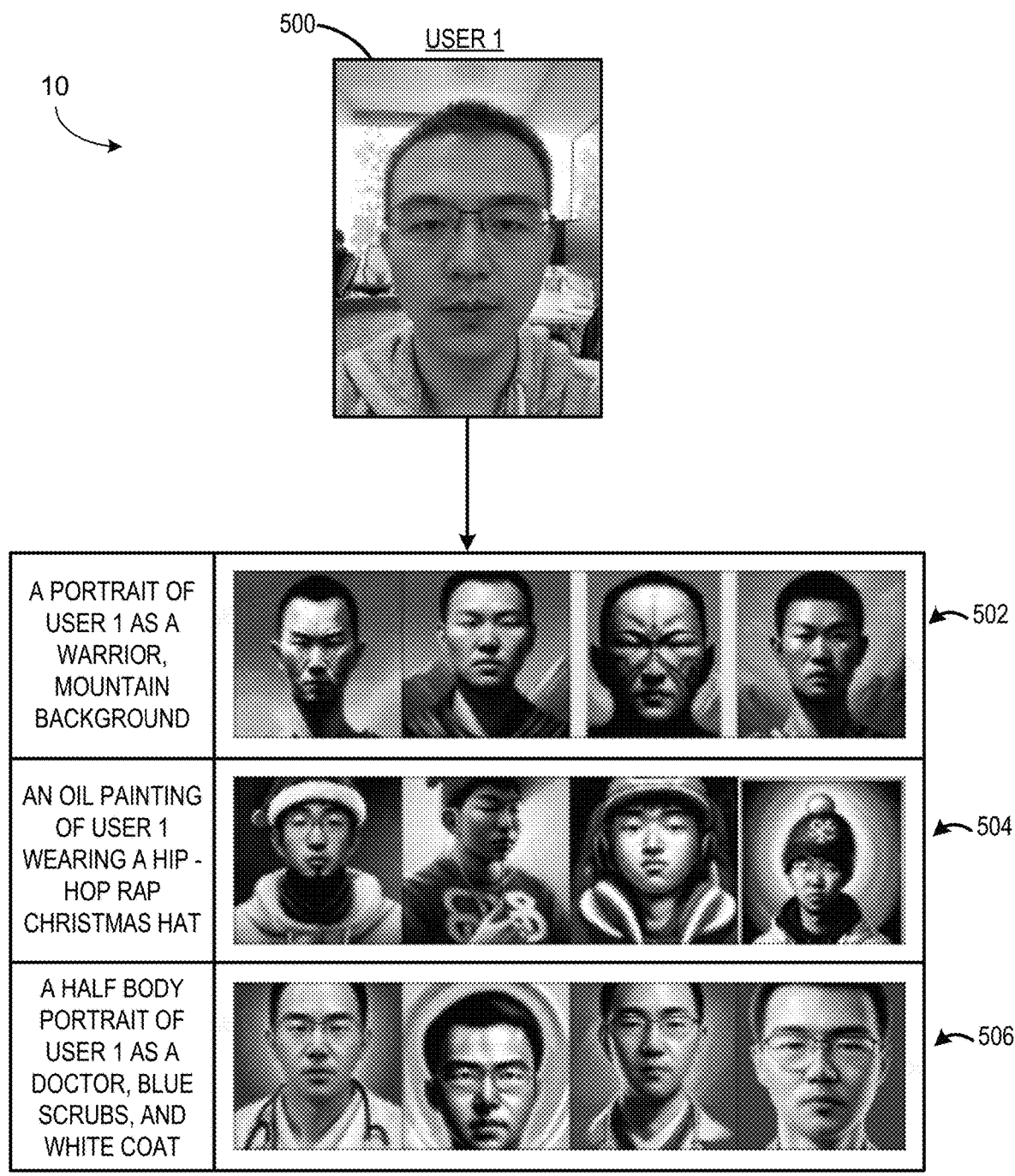
FIG. 5 shows an example image of a first user and a plurality of synthesized images of the first user generated by the trained machine learning diffusion model of the computing system of FIG. 1 based at least on the image of the first user.
Figure 6:
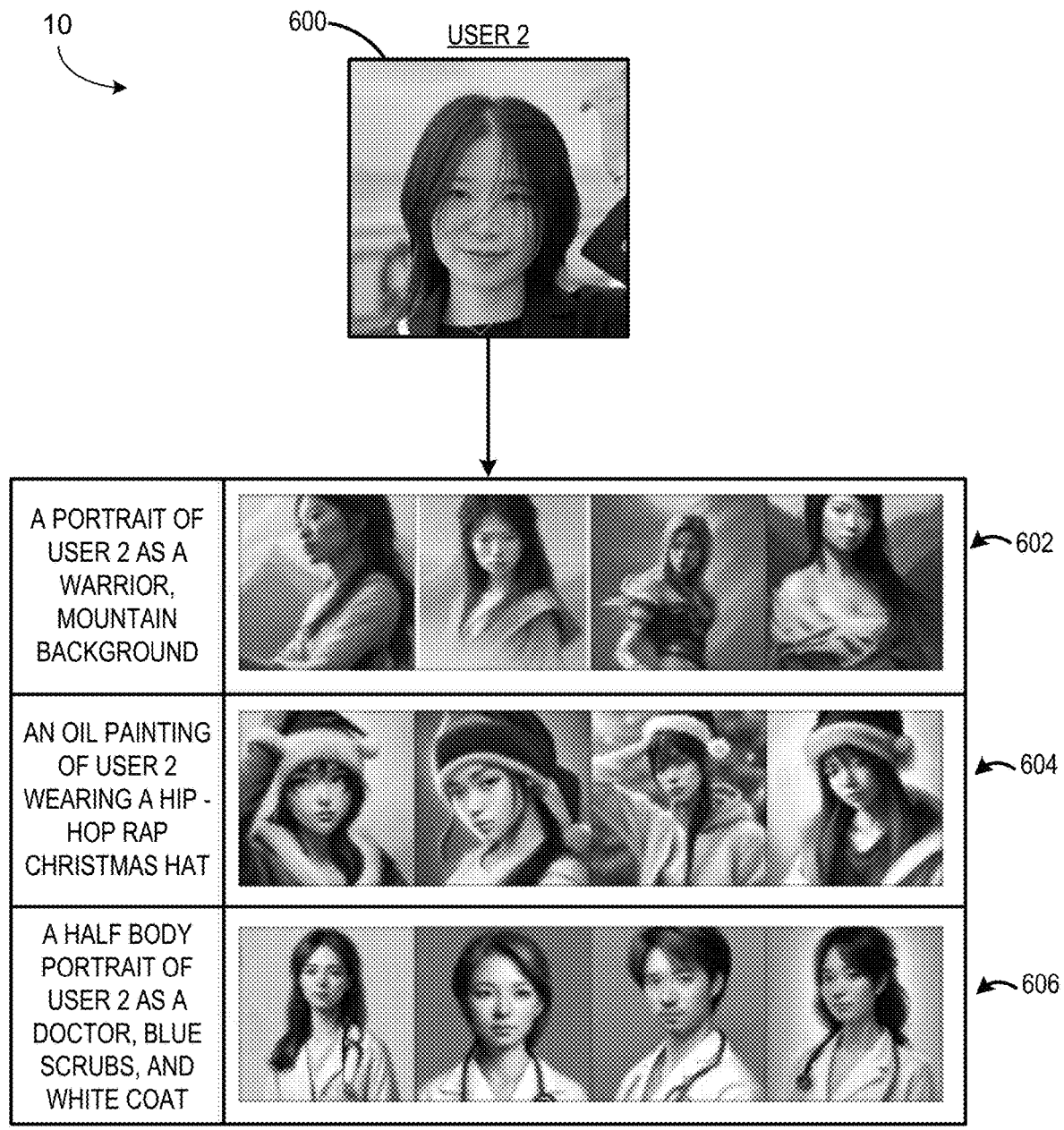
FIG. 6 shows an example image of a second user and a plurality of synthesized images of the second user generated by the trained machine learning diffusion model of the computing system of FIG. 1 based at least on the image of the second user.

FIGS. 5 and 6 show how different input images of different users produce different synthesized images even though the same word embeddings are used to generate the different synthesized images. FIG. 5 shows an example input image 500 of a first user and a plurality of synthesized images 502, 504, 506 of the first user generated by a trained machine learning diffusion model of the present disclosure based at least on the input image 500 of the first user. A first set of synthesized images 502 is generated based at least on the input image 500 and a set of word embeddings that specify a portrait of the first user as a warrior with a mountain background. A second set of synthesized images 504 is generated based at least on the input image 500 and a set of word embeddings that specify an oil painting of the first user wearing a hip-hop rap Christmas hat. A third set of synthesized images 506 is generated based at least on the input image 500 and a set of word embeddings that specify a half body portrait of the first user as a doctor wearing blue scrubs and a white coat.

FIG. 6 shows an example input image 600 of a second user and a plurality of synthesized images 602, 604, 606 of the second user generated by a trained machine learning diffusion model of the present disclosure based at least on the input image 600 of the second user. A first set of synthesized images 602 is generated based at least on the input image 600 and a set of word embeddings that specify a portrait of the first user as a warrior with a mountain background. The first set of synthesized images 602 of the second user correspond to the first set of synthesized images 502 of the first user except that the facial features differ between the different users. A second set of synthesized images 604 is generated based at least on the input image 600 and a set of word embeddings that specify an oil painting of the first user wearing a hip-hop rap Christmas hat. The second set of synthesized images 604 of the second user correspond to the second set of synthesized images 504 of the first user except that the facial features differ between the different users. A third set of synthesized images 606 is generated based at least on the input image 600 and a set of word embeddings that specify a half body portrait of the first user as a doctor wearing blue scrubs and a white coat. The third set of synthesized images 606 of the second user correspond to the third set of synthesized images 506 of the first user except that the facial features differ between the different users.

In some implementations, different user identifiers can be generated as placeholders for sets of embeddings that semantically describe the facial features of the first and second users determined from the different input images. These user identifiers can be combined with other scene words and style words to form descriptive sentences used to generate the different synthetic images.

Figure 7:
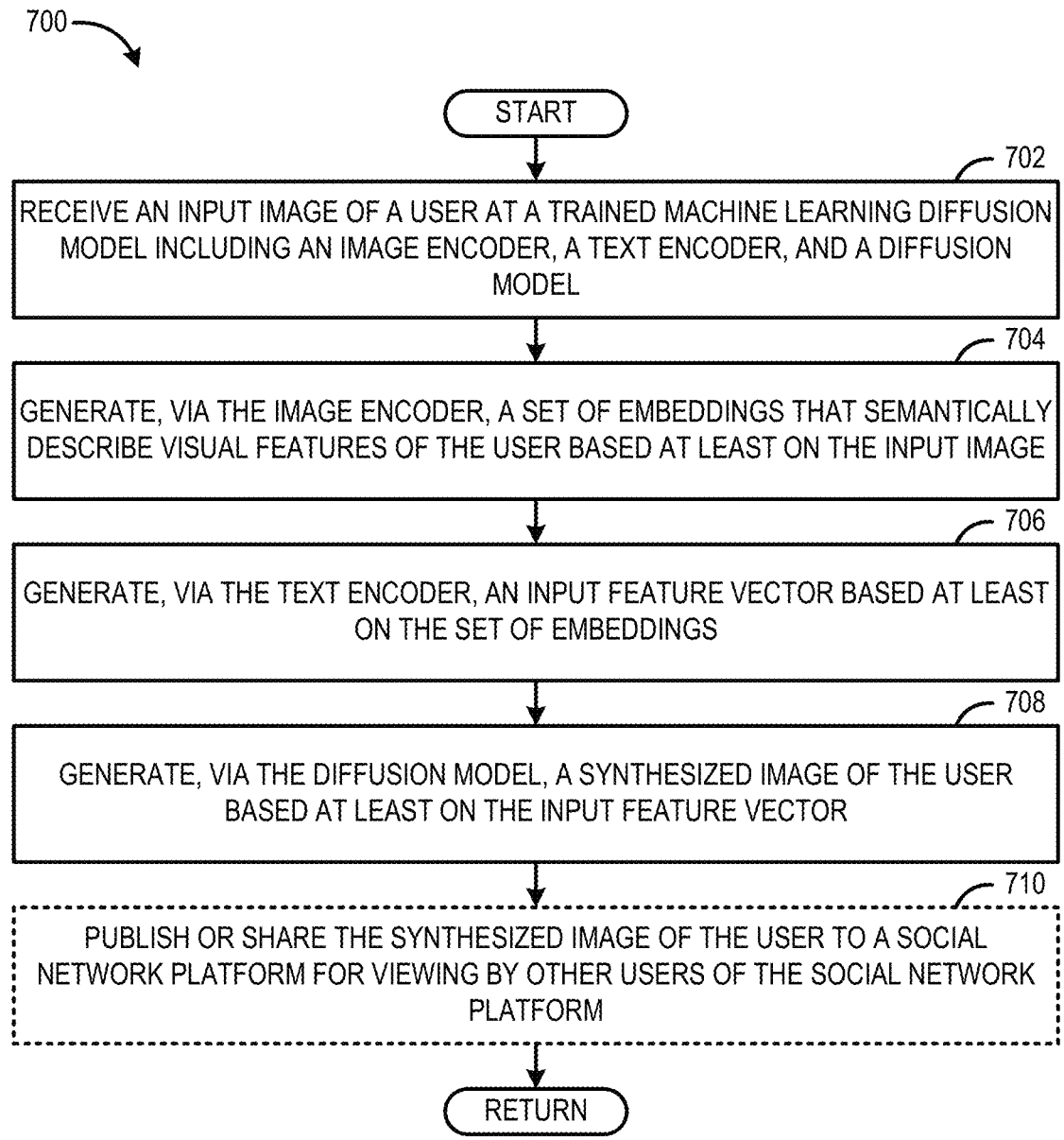
FIG. 7 is a flowchart of an example computer-implemented method for generating a synthesized image of a user with a trained machine learning diffusion model, according to one example of the present disclosure.

FIG. 7 is a flow chart of an example computer-implemented method 700 for generating a synthesized image of a user with a trained machine learning diffusion model. For example, the computer-implemented method 700 may be performed by the computing device 100 shown in FIG. 1, the smartphone 402 shown in FIGS. 4A-4D, or another computing device.

At 702, the computer-implemented method 700 includes receiving an input image of a user at a trained machine learning diffusion model including an image encoder, a text encoder, and a diffusion model.

At 704, the computer-implemented method 700 includes generating, via the image encoder, a set of embeddings that semantically describe visual features of the user based at least on the input image.

At 706, the computer-implemented method 700 includes generating, via the text encoder, an input feature vector based at least on the set of embeddings.

At 708, the computer-implemented method 700 includes generating, via the diffusion model, a synthesized image of the user based at least on the input feature vector.

In some implementations, at 710 the computer-implemented method 700 optionally may include publishing or sharing the synthesized image of the user to a social network platform for viewing by other users of the social network platform.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
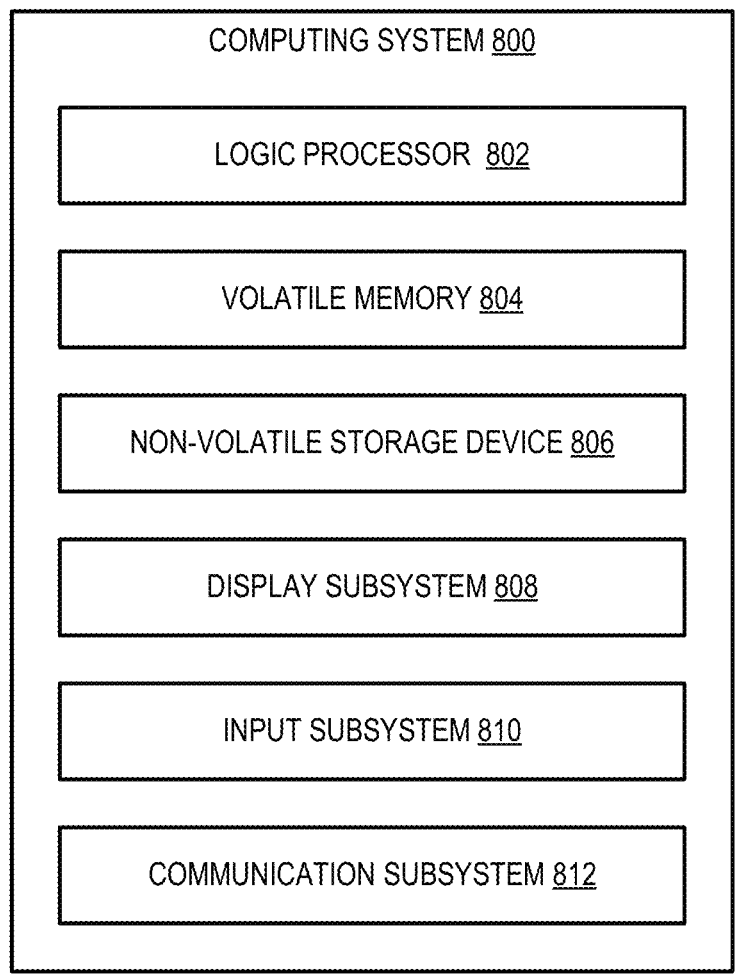
FIG. 8 schematically shows an example computing system environment in which the computing system of FIG. 1 may be implemented.

FIG. 8 schematically shows a non-limiting implementation of a computing system 800 that can enact one or more of the methods and processes described above. Computing system 800 is shown in simplified form. Computing system 800 may embody the computer device 100 shown in FIG. 1, the server computing system 120 shown in FIG. 1, and/or the smartphone 402 shown in FIGS. 4A-4D. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine 804, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some implementations, the input subsystem 808 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some implementations, the communication subsystem 810 may allow computing system 800 to send and/or receive messages to and/or from other devices via a network such as the Internet.

The following paragraphs provide additional description of the subject matter of the present disclosure. In an example, a computing device comprises a camera, a display, one or more processors configured to execute instructions stored in memory to execute a social media application including a graphical user interface (GUI) displayed via the display, the social media application being configured to communicate via a computer network with a social network platform executed on a server computing system, capture an image of a face of a user via the camera using the social media application, generate a synthesized image of the user via a trained machine learning diffusion model based at least on the captured image of the face of the user, display the synthesized image of the user in the GUI, and publish the synthesized image of the user to the social network platform for viewing by other users of the social network platform. In this example and/or other examples, the one or more processors may be configured to execute instructions stored in memory to display, via the display, a prompt in the GUI, the prompt directing the user to position the face of the user at a designated location in a field of view of the camera, and the image of the face of the may be captured via the camera based at least on detecting that the face of the user is positioned at the designated location in the field of view of the camera. In this example and/or other examples, the one or more processors may be configured to execute instructions stored in memory to capture a video stream of the user via the camera, and display, via the display, the video stream of the user incorporating the synthesized image of the user in the GUI, publishing the synthesized image may be accomplished by publishing the video stream of the user incorporating the synthesized image to the social network platform for viewing by other users of the social network platform. In this example and/or other examples, the trained machine learning diffusion model may include an image encoder, a text encoder, and a diffusion model, the image encoder may be configured to receive the image of the face of the user and generate a set of embeddings that semantically describe visual features of the face of the user based at least on the image of the face of the user, the text encoder may be configured to receive the set of embeddings and generate an input feature vector based at least on the set of embeddings, and the diffusion model may be configured to receive the input feature vector and generate the synthesized image of the user based at least on the input feature vector. In this example and/or other examples, the image encoder may include a plurality of pretrained layers that are trained for general object recognition and a plurality of fine-tuned layers that are retrained to extract visual features of a face of a user. In this example and/or other examples, the visual features of the face of the user may be extracted as a set of latent space embeddings, and the image encoder may include a fully connected layer configured to map the set of latent space embeddings to a set of word embeddings. In this example and/or other examples, the image encoder may be trained on a set of training images of faces to generate sets of training embeddings based at least on the set of training images of faces, the set of training embeddings semantically describing visual features of the faces in the set of training images, the text encoder may be trained on the set of training embeddings to generate a set of training feature vectors, and wherein the diffusion model is trained on the set of training feature vectors. In this example and/or other examples, a trained image captioning model may be configured to generate synthesized word embeddings describing visual features of training images in the set of training images, and the diffusion model may be trained based at least on input feature vectors corresponding to synthesized word embeddings for the set of training images. In this example and/or other examples, the set of training images may include a plurality of synthesized training images based at least on an initial training image, each of the plurality of synthesized training images may be modified relative to the initial training image by one or more of rotating, horizontally flipping, and/or cropping the initial training image to generate the synthesized training image. In this example and/or other examples, the set of embeddings output by the image encoder may be associated with a user identifier that is combinable with other word embeddings describing style and/or scene information of the synthesized image of the user. In this example and/or other examples, the trained machine learning diffusion model may include a library of predetermined templates of different sets of embeddings that describe different style and/or scene information, the text encoder may be configured to include a selected template from the library and generate the input feature vector based at least on selected template.

In another example, a computing system comprises one or more processors configured to execute instructions stored in memory to execute a trained machine learning diffusion model including an image encoder, a text encoder, and a diffusion model, the image encoder is configured to receive an image of a user and generate a set of embeddings that semantically describe visual features of the user based at least on the image of the user, the text encoder is configured to receive the set of embeddings and generate an input feature vector based at least on the set of embeddings, and the diffusion model is configured to receive the input feature vector and generate a synthesized image of the user based at least on the input feature vector. In this example and/or other examples, the image encoder may include a plurality of pretrained layers that are trained for general object recognition and a plurality of fine-tuned layers that are retrained to extract visual features of a face of a user. In this example and/or other examples, the image encoder may include a fully connected layer configured to generate the set of embeddings based at least on the visual features of the face of the user extracted by the plurality of fine-tuned layers. In this example and/or other examples, the visual features of the face of the user may be extracted as a set of latent space embeddings, and the fully connected layer may be configured to map the set of latent space embeddings to a set of word embeddings. In this example and/or other examples, the image encoder may be trained on a set of training images of faces to generate sets of training embeddings based at least on the set of training images of faces, the set of training embeddings may semantically describe visual features of the faces in the set of training images, the text encoder may be trained on the set of training embeddings to generate a set of training feature vectors, and the diffusion model may be trained on the set of training feature vectors. In this example and/or other examples, a trained image captioning model may be configured to generate synthesized word embeddings describing visual features of training images in the set of training images, and the diffusion model may be trained based at least on input feature vectors corresponding to synthesized word embeddings for the set of training images. In this example and/or other examples, the set of training images may include a plurality of synthesized training images based at least on an initial training image, each of the plurality of synthesized training images may be modified relative to the initial training image by one or more of rotating, horizontally flipping, and/or cropping the initial training image to generate the synthesized training image. In this example and/or other examples, the set of embeddings output by the image encoder may be associated with a user identifier that is combinable with other word embeddings describing style and/or scene information of the synthesized image of the user.

In yet another example a computer-implemented method comprises receiving an input image of a user at a trained machine learning diffusion model including an image encoder, a text encoder, and a diffusion model, generating, via the image encoder, a set of embeddings that semantically describe visual features of the user based at least on the input image, generating, via the text encoder, an input feature vector based at least on the set of embeddings, and generating, via the diffusion model, a synthesized image of the user based at least on the input feature vector.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing device comprising:
a camera;
a display;
one or more processors configured to execute instructions stored in memory to:
execute a social media application including a graphical user interface (GUI) displayed via the display, the social media application being configured to communicate via a computer network with a social network platform executed on a server computing system;
capture an image of a face of a user via the camera using the social media application;
generate a synthesized image of the user via a trained machine learning diffusion model based at least on the captured image of the face of the user, wherein the trained machine learning diffusion model includes an image encoder, a text encoder, and a diffusion model,
wherein the image encoder includes a plurality of pretrained layers that are trained for general object recognition and a plurality of fine-tuned layers, wherein the image encoder is configured to receive the image of the face of the user, re-train the fine-tuned layers specifically to extract visual features of the face of the user from the image of the user, and generate using the pretrained layers and the re-trained fine-tuned layers, a set of embeddings that semantically describe visual features of the face of the user based at least on the image of the face of the user,
wherein the text encoder is configured to receive the set of embeddings and generate an input feature vector based at least on the set of embeddings, and
wherein the diffusion model is configured to receive the input feature vector and generate the synthesized image of the user based at least on the input feature vector;
display the synthesized image of the user in the GUI; and
publish the synthesized image of the user to the social network platform for viewing by other users of the social network platform.

2. The computing device of claim 1, wherein the one or more processors are configured to execute instructions stored in memory to:
display, via the display, a prompt in the GUI, the prompt directing the user to position the face of the user at a designated location in a field of view of the camera, and wherein the image of the face of the user is captured via the camera based at least on detecting that the face of the user is positioned at the designated location in the field of view of the camera.

3. The computing device of claim 1, wherein the one or more processors are configured to execute instructions stored in memory to:
capture a video stream of the user via the camera; and
display, via the display, the video stream of the user incorporating the synthesized image of the user in the GUI;
wherein publishing the synthesized image is accomplished by publishing the video stream of the user incorporating the synthesized image to the social network platform for viewing by other users of the social network platform.

4. The computing device of claim 1, wherein the visual features of the face of the user are extracted as a set of latent space embeddings, and wherein the image encoder includes a fully connected layer configured to map the set of latent space embeddings to a set of word embeddings.

5. The computing device of claim 1, wherein the image encoder is trained on a set of training images of faces to generate sets of training embeddings based at least on the set of training images of faces, the set of training embeddings semantically describing visual features of the faces in the set of training images, wherein the text encoder is trained on the set of training embeddings to generate a set of training feature vectors, and wherein the diffusion model is trained on the set of training feature vectors.

6. The computing device of claim 5, wherein a trained image captioning model is configured to generate synthesized word embeddings describing visual features of training images in the set of training images, and wherein the diffusion model is trained based at least on input feature vectors corresponding to synthesized word embeddings for the set of training images.

7. The computing device of claim 5, wherein the set of training images includes a plurality of synthesized training images based at least on an initial training image, each of the plurality of synthesized training images being modified relative to the initial training image by one or more of rotating, horizontally flipping, and/or cropping the initial training image to generate the synthesized training image.

8. The computing device of claim 1, wherein the set of embeddings output by the image encoder are associated with a user identifier that is combinable with other word embeddings describing style and/or scene information of the synthesized image of the user.

9. The computing device of claim 1, wherein the trained machine learning diffusion model includes a library of predetermined templates of different sets of embeddings that describe different style and/or scene information, wherein the text encoder is configured to include a selected template from the library and generate the input feature vector based at least on selected template.

10. A computing system comprising:
one or more processors configured to execute instructions stored in memory to execute a trained machine learning diffusion model including an image encoder, a text encoder, and a diffusion model,
wherein the image encoder includes a plurality of pre-trained layers that are trained for general object recognition and a plurality of fine-tuned layers, wherein the image encoder is configured to receive an image of a user, re-train the fine-tuned layers specifically to extract visual features of the user from the image of the user, and generate, using the pretrained layers and the re-trained fine-tuned layers, a set of embeddings that semantically describe visual features of the user based at least on the image of the user,
wherein the text encoder is configured to receive the set of embeddings and generate an input feature vector based at least on the set of embeddings, and
wherein the diffusion model is configured to receive the input feature vector and generate a synthesized image of the user based at least on the input feature vector.

11. The computing system of claim 2, wherein the image encoder includes a fully connected layer configured to generate the set of embeddings based at least on the visual features of the user extracted by the plurality of fine-tuned layers.

12. The computing system of claim 11, wherein the visual features of the user are extracted as a set of latent space embeddings, and wherein the fully connected layer is configured to map the set of latent space embeddings to a set of word embeddings.

13. The computing system of claim 10, wherein the image encoder is trained on a set of training images of different users to generate sets of training embeddings based at least on the set of training images of different users, the set of training embeddings semantically describing visual features of the different users in the set of training images, wherein the text encoder is trained on the set of training embeddings to generate a set of training feature vectors, and wherein the diffusion model is trained on the set of training feature vectors.

14. The computing system of claim 13, wherein a trained image captioning model is configured to generate synthesized word embeddings describing visual features of training images in the set of training images, and wherein the diffusion model is trained based at least on input feature vectors corresponding to synthesized word embeddings for the set of training images.

15. The computing system of claim 13, wherein the set of training images includes a plurality of synthesized training images based at least on an initial training image, each of the plurality of synthesized training images being modified relative to the initial training image by one or more of rotating, horizontally flipping, and/or cropping the initial training image to generate the synthesized training image.

16. The computing system of claim 10, wherein the set of embeddings output by the image encoder are associated with a user identifier that is combinable with other word embeddings describing style and/or scene information of the synthesized image of the user.

17. A computer-implemented method comprising:
receiving an input image of a user at a trained machine learning diffusion model including an image encoder, a text encoder, and a diffusion model wherein the image encoder includes a plurality of pretrained layers that are trained for general object recognition and a plurality of fine-tuned layers;
re-training, via the image encoder, the fine-tuned layers specifically to extract visual features of the user from the image of the user;
generating, using the pretrained layers and the re-trained fine-tuned layers of the image encoder, a set of embeddings that semantically describe visual features of the user based at least on the input image;
generating, via the text encoder, an input feature vector based at least on the set of embeddings; and
generating, via the diffusion model, a synthesized image of the user based at least on the input feature vector.

* * * * *